W. H. APPLEMAN.
STEERING GEAR FOR MOTOR VEHICLES.
APPLICATION FILED MAY 2, 1910.
1,159,348.
Patented Nov. 9, 1915.
3 SHEETS—SHEET 3.
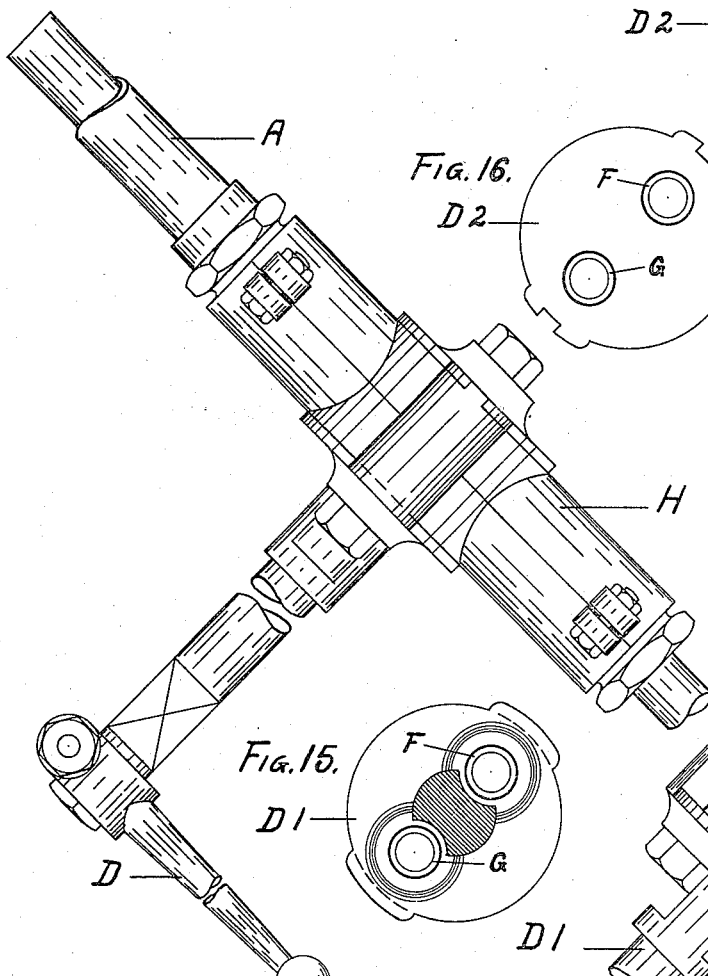
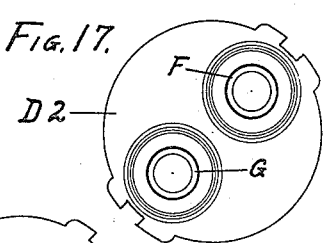
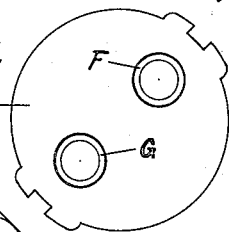
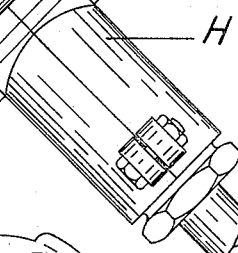
WITNESSES.
INVENTOR.

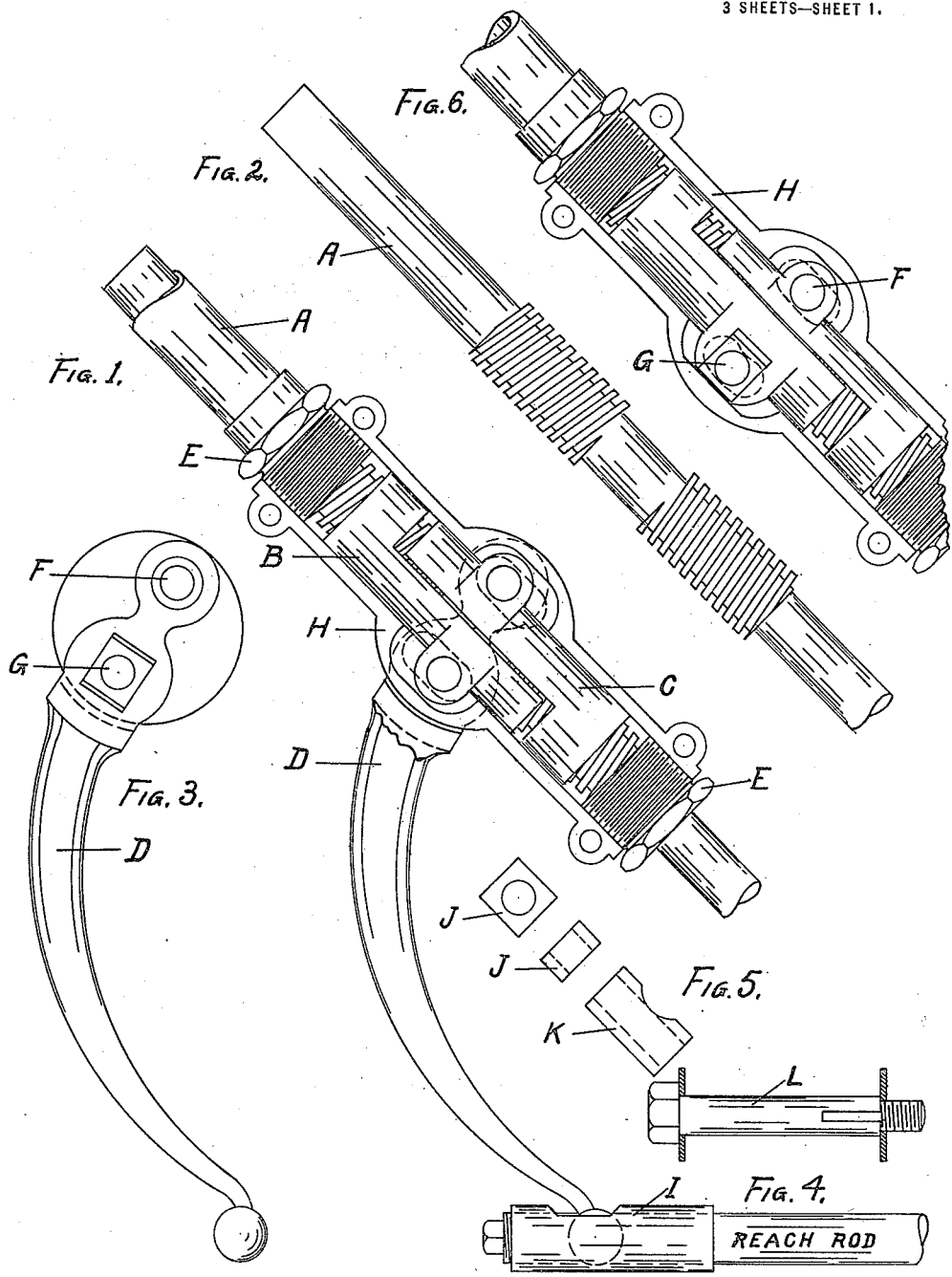

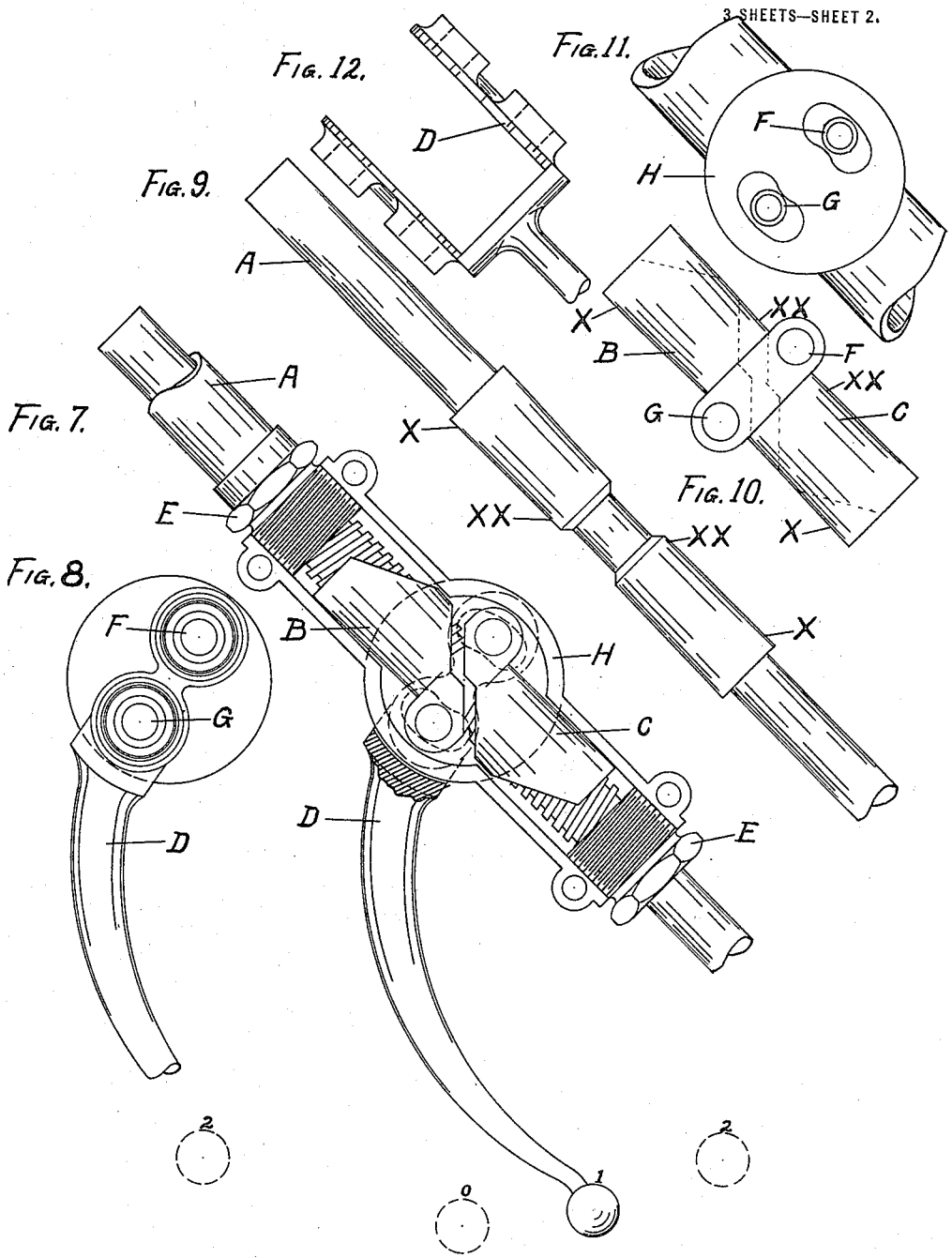

UNITED STATES PATENT OFFICE.

WILLIAM H. APPLEMAN, OF PITTSBURGH, PENNSYLVANIA.

STEERING-GEAR FOR MOTOR-VEHICLES.

1,159,348.  Specification of Letters Patent.  Patented Nov. 9, 1915.

Application filed May 2, 1910. Serial No. 559,034.

*To all whom it may concern:*

Be it known that I, WILLIAM H. APPLEMAN, a citizen of the United States, and a resident of Pittsburgh, in the county of Allegheny and State of Pennsylvania, have invented a new and useful Improvement in Steering-Gears for Motor-Vehicles, of which the following is a specification.

My invention relates especially to that portion of the steering mechanism which actuates what is usually termed the steering arm.

The object of my invention is to provide a steering device of superior strength and durability, exceptional accessibility of interior parts, simplicity of adjustment in case of wear, and at the same time greatly reduce the cost of construction. I attain this object in the mechanism illustrated in the accompanying drawing in which—

Figure 1 is a right side elevation view inclined in about the same position as it would occupy when attached to a car, the right hand branch of the forked arm and the right or near side of the housing, being removed in order to afford an unobstructed view of the internal mechanism, the pivotal bolts L being also removed in order that all the openings indicated at points F and G may be seen to pass entirely through the entire device. Fig. 2 is a general view of that portion of the steering post that enters the housing, and is provided with a right hand and a left hand thread, spaced apart and leaving an unthreaded space in the center of less diameter than the threaded portions. Fig. 3 is a right side elevation view of a forked arm which in service occupies the position in which it is shown in Fig. 1. Fig. 4 is a short or stub section of a reach rod, which serves as a connection between what is usually known as a steering gear, and other portions of the steering mechanism leading to the axles of the vehicle. Fig. 5 is a view of the type of bolts or pins used for pivotally attaching arm D, Figs. 1 and 3 to the internal mechanism shown in Fig. 1, and grouped along with it is a side and end view of thimbles which may be used on one of said bolts, preferably at G. Fig. 6 is identically the same as Fig. 1, omitting arm D and with the exception that the sliding block at pivotal point G is transferred from within the forks of arm D to within a slotted opening in nut B, but is on the same pivotal bolt or pin. Fig. 7 is in every sense a duplicate of Fig. 1, except that provision for sufficient oscillation in the pivotal ends of nuts B and C has been made to accommodate them to the radial movements of their pivotal connections with arm D and whereby the pivotal connections may be fixed ones, instead of either of them having a sliding movement. Fig. 8 is a side elevation of an arm similar to arm D, of Figs. 1 and 3 except that both pivotal openings at F and G are fixed, neither being slotted, thus perfectly adapting it to use with the oscillating nuts shown in Fig. 7. Fig. 9 is a view of a blank or unfinished section of the steering post and is offered to more distinctly show the taper in the portions that are to be threaded than can be shown in Fig. 7, on account of the threads on same in Fig. 7 being almost wholly concealed by nuts B and C. Fig. 10 is a view of a blank from which nuts like B and C Fig. 7 are made, and is offered in order to more fully illustrate their external reduction in diameter at points marked x x. By milling same apart two right hand or two left hand nuts are obtained owing to the thread used. Fig. 11 is a side view of the central part of the housing H, showing the enlargement in the housing for forming the chamber to receive the bosses on nuts B and C, and also showing the slotted opening through which the pivotal connections between nuts B and C and arm D of Figs. 1—6—8 and 13 are effected. Fig. 12 may be considered as either a front or rear view of the forked end of arm D of Figs. 7 and 8 and substantially of Figs. 1 and 3 although to be technically exact, the bosses at G, Figs. 1 and 3 would be just a shade larger to accommodate a sliding pivotal connection, but this feature does not show distinctly enough in this type of view to require a specific drawing. Fig. 13 is either a front or rear view of my device as it would appear when assembled, except that instead of the regular forked arm D Figs. 1—3—7—8 and 12 being shown, a modification is illustrated which may be substituted, and actuated as well as supported by the original and regular pivotal pins at F and G of all figures. Fig. 14 is a top plan view of the modification stated, of an oscillating member which may take place of D in all other figures, and is therefore designated as $D^1$, pivotal bolts L being shown with it. Fig. 15 is an end view of same as it would appear if sawed off even with the bolt heads shown in Fig. 14. Figs. 16 and 17 are plan views of the inside and outside of plate D² which is applied to Fig. 14, when it is assembled complete either on or off of my device.

I have seen fit to show the aforesaid nuts B and C as fully encircling the steering posts, but wherever I have used the term nut in referring to them, either in the specification or claims I have meant to imply a threaded member of such proportions as to support an enlargement or boss, and at the same time form a reasonable engagement with the threads on the steering post. This may be effected with any reasonable portion of a full circular nut.

Similar letters indicate similar parts shown throughout the several figures.

A—Figs. 1 and 2 is the lower or working portion of a rotatable steering post with a right hand and a left hand thread on and turning with said steering post, B and C are left hand and right hand nuts designed to engage with and move longitudinally upon their respective threads on the steering post, the greater portion of said nuts presumably being circular on their outer surface, and of suitable diameter to move freely within the bore of the housing H, each of said nuts being provided at or near what I choose to term their inner ends, with an enlargement or boss for receiving or supporting pivotal connections or pins like or similar to those indicated by L Fig. 5. Nuts B and C are threaded internally from their extreme outer ends up to where the bosses begin, but from thence to their extreme inner ends they are enlarged or bored out so as to permit this portion of said nuts to ride smoothly over that portion of the opposing threads which may chance to rest within them.

D is the arm or member which connects with and actuates the reach rod Fig. 4, and is forked at its upper or inner end so as to permit one of its branches to pass on either side of housing H, nuts B and C and steering post A, the upper or what I term the inner or forked end is provided with openings similarly spaced in each branch and indicated by points F and G, letters F and G being broadly used and also serving to designate corresponding openings in nuts B and C. In arm D the openings at either F or G (but not both) are slightly slotted or elongated in order to provide pivotal compensation of a character which will be hereinafter referred to, and this slotted opening may also be chambered out to permit of inserting a thimble as indicated by J. J. in each branch of said fork. The circular outlines of the inner or forked portion of arm D indicate a web or flanged effect which corresponds with the outlines of the central portion of housing H. and also serves to stiffen as well as add to said arms symmetrical appearance.

H indicates the housing which is of a cylindrical character, externally as well as internally, except at the middle of its length where it is enlarged in order to provide suitable chambers for the bosses on nuts B and C. For convenience I have shown it bisected from end to end on a central line at right angles from the natural line of vision, a very satisfactory front or rear view (both being the same) may be obtained by reference to Fig. 13, and by totally disregarding the application of Figs. 14 and 15.

In H Figs. 1—3—7—11 slotted openings are indicated in the housing at points F and G by means of dotted lines, similar openings of course being also made in corresponding positions of that half of the housing that has been removed, and as more clearly indicated by Fig. 11. These openings permit of a pivotal bolt such as indicated by L being passed entirely through the forks of arm D, the housing H and nuts B and C at points indicated by F and G and at the same time permit said bolts to travel back and forth with said nuts without any interference from the housing.

E and E are sleeve nuts which serve to close up the ends of the housing around the steering post A and also help maintain the latter's alinement in the housing H besides providing for its lateral adjustment.

I, indicates one of the various forms of connections used between oscillating arms and reach rods.

J and J presents an end and side view of a thimble such as I have shown at G, Fig. 3, one of which may be used in each branch of the forks of said arm at G. when desired by enlarging the slotted opening at G as shown in Fig. 3 to receive it.

In describing the operation it is necessary to assume that a pivotal bolt L has been placed in each of the openings F and G Fig. 1, and if the steering post A now be turned back and forth to the right and left it will cause nuts B and C to move back and forth longitudinally in housing H on the steering post, and the bosses on nuts B and C along with their pivotal openings and pivotal pins on bolts which they then contain, will also travel back and forth so as to pass or partly pass one another, and by reason of these bolts also passing through corresponding openings in the forks of arm D a positive oscillatory movement is imparted to said arm. Nuts B and C receive a very liberal support direct from the steering post and while also being further supported by housing H, still if arm D be held from rotating, its oscillatory movement is effected equally as well without housing H as with it, as nuts B and C each become effective in either direction, and with or without direct aid from the housing provide a direct and complete pivotal support for arm D.

In Figs. 1 and 6, housing H is supposed to fit the external surface of the greater portions of nuts B and C, and both of said nuts are supposed to travel at all times parallel with steering post A and as arm D oscillates, one of its pivotal openings must be permitted to travel on a radial line. This radial movement calls for a slotted opening in either arm D or one of the nuts B and C at either F or G, and in Figs. 1 and 6, I show it in each fashion at G as being preferable, and hereinafter refer to it as compensation or provision for compensation.

In Figs. 6—7 and 13 as well as their various component figures, parts similar to or corresponding to those of Fig. 1 are also indicated by similar letters.

Fig. 6 is so similar in construction and operation to Fig. 1 as to need no general detailed description, the only distinction being in the method of providing compensation at G, and which consists of making a slotted opening at a right angle with steering post A in either nut B or C, preferably in B at point G, and in which event the pivotal openings in arm D at point G would no longer need to be slotted and if an internal thimble also be used, the latter would then conform in length to K Fig. 5, thus being in length equal to the diameter of the circular outlines of nut B. This slight modification of Fig. 1 merely transfers the compensation at point G, to within the confines of nut B, instead of leaving it within the confines of arm D but in every other sense it is identical with Fig. 1. The modification presented in Fig. 7 is also so slight as to call for no general detailed description, since it also deals entirely with the means of providing compensation required as a result of the radial movement of arm D, and is accomplished as follows: Commencing at the outer ends of nuts B and C, they are slightly tapered externally up to where the bosses are formed, while the threads on the steering post A are also slightly tapered from the outer toward the inner extremes of their respective lengths, this latter taper is indicated by blank A Fig. 9 while the former is indicated by blanks B and C Fig. 10, and indicates how they would appear before they are cut apart and finished. In each the normal diameter is at X and the reduced diameters at $x$ $x$. The slight change in the shape of nuts B and C Fig. 7 may be regarded as incidental, as it has no other significance than that of permitting them to be threaded a little tighter or closer on steering post A. The foregoing provision for compensation also calls for the same slight change in arm D as did Fig. 6 that is the openings at G do not need to be slotted, but are both fixed as shown more distinctly in arm D Fig. 8. It will now be found that as the steering post A is rotated back and forth and nuts B and C Fig. 7 move longitudinally, their pivotal ends will rise partly out or drop more deeply into mesh with their respective threads on steering post A and that their pivotal ends will describe a radial as well as longitudinal movement, that is they will nod or oscillate. They continue however, to serve as the direct pivotal support for arm D and the pivotal connections between them are fixed, while the compensation which is no longer provided by a sliding pivotal connection, is provided by the oscillation of the nuts themselves without any noticeable departure in the lateral fit of their threads in relation to those on steering post A.

Fig. 11 presents a side view of the central portion of housing H of Figs. 1—6—7 and 13.

Fig. 12 presents either a rear or front view of the forked portion of arm D Figs. 1—3— 7 and 8.

Fig. 13 presents both a rear and front view of housing H, in Figs. 1—6—7 and 11 and also presents a modification in the manner of applying an oscillating arm to either Figs. 6 and 7 without involving changes in their internal construction, while by slotting opening G in Figs. 15—16 and 17 they then become adapted to Fig. 1. Figs. 14—15—16 and 17 therefore present chiefly an anticipated construction and application of an oscillating arm, involving a rock shaft which in turn is supported at its housing end by a fork similar in principle to the forked end of arm D, Figs. 1—3—7 and 8, and which in turn is also directly supported by its pivotal connections with nuts B and C, Figs. 6—7 and 13, the arm itself being carried and oscillated by said rock shaft. In order to further emphasize the fact that the modifications presented in Figs. 6 and 7 deal wholly with the means of compensation required at the pivotal connections between arms D Figs. 1—6 and 7, I wish to state that the distinction although of extreme importance in actual service, is otherwise so slight, and the contour of contact points of nuts B and C Figs. 1—6 and 7 so insignificant, that nuts as well as steering post A of Figs. 1 and 7 are adapted to use with housing H, of Fig. 6 and at the same time similar parts of Fig. 7 are also adapted to use in housing H of Fig. 1. Furthermore if the threads on steering post A Fig. 1 be slightly tapered as in Fig. 7 and nuts B and C of Fig. 1, be also slightly tapered or reduced in diameter near their bosses arm D Figs. 7 and 8 will then be perfectly adapted to use with them, and the entire performance of such combination would become identical with that of Fig. 7, without materially impairing its life of service.

What I claim therefore as my invention is *i. e.*

1. The combination of a rotatable steering post having a right hand and a left hand thread thereon, a right hand and a left hand nut moving longitudinally on said threads, an extension or boss on each of said nuts having a pivotal opening therein, an oscillating member, and a pivotal bolt or pin passing through each of said bosses and through said oscillating member.

2. The combination of a rotatable steering post having a right hand and a left hand thread thereon, a right hand and a left hand nut moving longitudinally on said threads, a rocking member, and a direct pivotal connection between each of said nuts and said rocker, by means of which the longitudinal force of each of said nuts in either direction is directly delivered to said rocker.

3. The combination of a housing, a rotatable steering post entering therein having a right hand and a left hand thread thereon, a right hand and a left hand nut moving longitudinally on said threads, an enlargement or abutment on each of said nuts having a transverse opening therein, a rocking member, and a pivotal bolt or pin passing through each of said transverse openings and entering into said rocking member.

4. The combination of a housing, a rotatable steering post entering therein, having a right hand and a left hand thread thereon, a right hand and a left hand nut moving longitudinally on said threads and having abutments thereon, pivotal bolts or pins passing through said abutments respectively, and a rocking member fulcrumed upon and resting wholly upon said bolts or pins.

5. The combination of a rotatable steering post having a right hand and a left hand thread thereon, a right hand and a left hand nut moving longitudinally on said threads, an extension or boss on each of said nuts having a pivotal opening therein, a pivotal bolt or pin passing through each of said bosses, and a rocker which is pivotally supported by being attached directly to both of said pins.

6. The combination of a rotatable steering post having a right hand and a left hand thread thereon, a right hand and a left hand nut moving longitudinally on said threads, an extension or boss on each of said nuts having a pivotal opening therein, a pivotal bolt or pin passing through each of said bosses, and a rocker which is fulcrumed directly upon both of said bolts or pins.

7. The combination of a housing, a rotatable steering post entering therein having a right hand and a left hand thread thereon, a right hand and a left hand nut moving longitudinally on said threads, an extension or boss on each of said nuts having a pivotal opening therein, an externally applied rocker having a member lying on each side of both of said bosses, two externally applied bolts or pins both of which pass through both members of said rocker, and each of which also passes through the pivotal opening in one of said bosses.

8. The combination of a steering post having a right hand and a left hand thread thereon, a right hand and a left hand nut having both a longitudinal and an oscillatory motion upon said threads, an oscillating member, and a means of connecting both of said nuts with said oscillating member.

9. The combination of a steering post having a thread thereon, a nut traveling longitudinally and also swinging longitudinally on said thread, and a means for transmitting motion from said nut to an adjacent steering arm.

10. The combination of a housing, a steering post entering therein and having a thread thereon, a nut traveling longitudinally and also swinging longitudinally on said thread, and a means for transmitting motion from said nut to an adjacent steering arm.

11. The combination of a housing, a rotatable steering post entering therein having a right hand and a left hand thread thereon, a right hand and a left hand nut moving longitudinally on said thread, an extension or boss on each of said nuts having a pivotal opening therein, a rocker having a member lying on each side of both of said bosses, two externally applied bolts or pins both of which pass through both members of said rocker, and each of which passes through the pivotal opening in one of said bosses.

12. The combination of a housing, a rotatable steering post entering therein, having a right hand and a left hand thread thereon, a right hand and a left hand nut moving longitudinally on said threads, an abutment or boss on each of said nuts, a pivotal bolt or pin carried by each of said abutments and a rocking member having a pivotal relation with said housing by being pivotally mounted on both of said bolts or pins.

WILLIAM H. APPLEMAN

Witnesses:
GEO. D. PRENTICE,
W. T. JOHNSON.